US010042168B2

(12) United States Patent
Yang et al.

(10) Patent No.: US 10,042,168 B2
(45) Date of Patent: Aug. 7, 2018

(54) HEAD-MOUNTED ELECTRONIC DEVICE

(71) Applicant: SHENZHEN ROYOLE TECHNOLOGIES CO. LTD., Shenzhen (CN)

(72) Inventors: Songling Yang, Shenzhen (CN); Songya Chen, Shenzhen (CN); Chao Jiang, Shenzhen (CN)

(73) Assignee: SHENZHEN ROYOLE TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/058,913

(22) Filed: Mar. 2, 2016

(65) Prior Publication Data

US 2017/0052378 A1    Feb. 23, 2017

Related U.S. Application Data

(63) Continuation of application No. PCT/CN2015/087564, filed on Aug. 19, 2015.

(51) Int. Cl.
  *G02B 27/01*     (2006.01)
  *H04R 1/10*     (2006.01)

(52) U.S. Cl.
  CPC ....... *G02B 27/0176* (2013.01); *H04R 1/1008* (2013.01); *H04R 1/1058* (2013.01); *H04R 2499/15* (2013.01)

(58) Field of Classification Search
  CPC .... H04R 1/026; H04R 1/1066; H04R 1/1075; H04R 5/033; H04S 7/304

(Continued)

(56) References Cited

U.S. PATENT DOCUMENTS 5,003,300 A    3/1991    Wells
5,321,416 A    6/1994    Bassett et al.
(Continued)

FOREIGN PATENT DOCUMENTS

CN    2525546 Y    12/2002
CN    2819243 Y    9/2006
(Continued)

OTHER PUBLICATIONS

Chen, Office Action, U.S. Appl. No. 15/059,111, dated May 18, 2017, 10 pgs.

(Continued)

*Primary Examiner* — George C Monikang
(74) *Attorney, Agent, or Firm* — Morgan, Lewis & Bockius LLP (57) ABSTRACT

The present application refers to a head-mounted electronic device including a headphone and a display portion. The headphone includes a C-shaped elastic belt and has two connection ends, and two sound generators connected to the connection ends respectively. The display portion includes a main body configured for generating and projecting images, and two connection members which are connected to opposite ends of the main body respectively and are rotatably connected to the sound generators respectively. Each connection member arranged between the corresponding sound generator and the main body defines a notch. When the display portion is rotated relative to the headphone, possible distortion of the display portion is limited to the connection member where the notch is defined, protecting the main body and the sound generator from deformation, and thus facilitating the display portion to rotate relative to the headphone.

15 Claims, 6 Drawing Sheets

(58) Field of Classification Search
USPC .......................................... 381/370, 378–379
See application file for complete search history.

(56) References Cited

U.S. PATENT DOCUMENTS

| | | | |
|---|---|---|---|
| 5,737,012 A | 4/1998 | Tabata et al. | |
| 5,903,395 A | 5/1999 | Rallison | |
| 6,369,952 B1 | 4/2002 | Rallison et al. | |
| 6,421,031 B1 | 7/2002 | Ronzani et al. | |
| 6,424,321 B1 | 7/2002 | Ronzani et al. | |
| 8,577,427 B2 | 11/2013 | Serota | |
| 2002/0005819 A1 | 1/2002 | Ronzani et al. | |
| 2002/0094094 A1* | 7/2002 | Shin | H04R 1/1066 381/104 |
| 2002/0163486 A1 | 11/2002 | Ronzani et al. | |
| 2004/0201695 A1 | 10/2004 | Inasaka | |
| 2006/0062417 A1* | 3/2006 | Tachikawa | H04R 1/1066 381/378 |
| 2006/0072206 A1 | 4/2006 | Tsuyuki et al. | |
| 2007/0256107 A1 | 11/2007 | Anderson, Jr. et al. | |
| 2009/0115687 A1 | 5/2009 | Chiaki | |
| 2012/0069448 A1 | 3/2012 | Sugihara et al. | |
| 2012/0098971 A1 | 4/2012 | Hansen et al. | |
| 2012/0162764 A1 | 6/2012 | Shimizu | |
| 2012/0244813 A1 | 9/2012 | Liao et al. | |
| 2013/0195308 A1* | 8/2013 | Tankersley | A61F 11/06 381/378 |
| 2014/0078333 A1 | 3/2014 | Miao | |
| 2014/0133670 A1* | 5/2014 | Lee | H04R 5/0335 381/74 |
| 2014/0272915 A1 | 9/2014 | Higashino et al. | |
| 2014/0320972 A1 | 10/2014 | Magyari et al. | |
| 2014/0364208 A1 | 12/2014 | Perry | |
| 2014/0364209 A1 | 12/2014 | Perry | |
| 2015/0016654 A1 | 1/2015 | Serota | |
| 2015/0103606 A1 | 4/2015 | Seong | |
| 2016/0005231 A1 | 1/2016 | Yamaga | |
| 2016/0018659 A1 | 1/2016 | Miyagawa | |
| 2016/0044981 A1 | 2/2016 | Frank et al. | |
| 2016/0249124 A1 | 8/2016 | Drinkwater et al. | |
| 2016/0349519 A1 | 12/2016 | Yang et al. | |
| 2016/0366502 A1 | 12/2016 | Morris et al. | |
| 2017/0052378 A1 | 2/2017 | Yang et al. | |
| 2017/0055061 A1 | 2/2017 | Yang et al. | |
| 2017/0055079 A1 | 2/2017 | Yang et al. | |
| 2017/0075121 A1 | 3/2017 | Chen et al. | |
| 2017/0090201 A1 | 3/2017 | Guo | |

FOREIGN PATENT DOCUMENTS

| | | | |
|---|---|---|---|
| CN | 2938154 Y | 8/2007 | |
| CN | 101336008 A | 12/2008 | |
| CN | 201336696 Y | 10/2009 | |
| CN | 102387442 A | 3/2012 | |
| CN | 202455514 U | 9/2012 | |
| CN | 102918443 A | 2/2013 | |
| CN | 103149690 A | 6/2013 | |
| CN | 103581779 A | 2/2014 | |
| CN | 103596099 A | 2/2014 | |
| CN | 103702257 A | 4/2014 | |
| CN | 203747962 U | 7/2014 | |
| CN | 104166239 A | 11/2014 | |
| CN | 104254037 A | 12/2014 | |
| CN | 204180248 U | 2/2015 | |
| CN | 204229050 U | 3/2015 | |
| CN | 104503083 A | 4/2015 | |
| CN | 104503086 A | 4/2015 | |
| CN | 104503584 A | 4/2015 | |
| CN | 104503585 A | 4/2015 | |
| CN | 204302573 U | 4/2015 | |
| CN | 104635340 A | 5/2015 | |
| CN | 104765149 A | 7/2015 | |
| CN | 104793338 A | 7/2015 | |
| CN | 204575970 U | 8/2015 | |
| CN | 204666953 U | 9/2015 | |
| JP | 2007243631 A | 9/2007 | |
| JP | 2010145859 A | 7/2010 | |
| WO | WO2007119351 A1 | 10/2007 | |

OTHER PUBLICATIONS

Chen, Notice of Allowance, U.S. Appl. No. 15/059,111, dated Sep. 7, 2017, 7 pgs.
Guo, Office Action, U.S. Appl. No. 15/059,119, dated Aug. 24, 2017, 9 pgs.
International Search Report and Written Opinion, PCTCN2015080363, dated Feb. 3, 2016, 9 pgs.
International Search Report and Written Opinion, PCT/CN2015/087565, dated May 23, 2016, 9 pgs.
International Search Report and Written Opinion, PCT/CN2015/087566, dated Jan. 13, 2016, 9 pgs.
International Search Report and Written Opinion, PCT/CN2015/087564, dated May 10, 2016, 9 pgs.
International Search Report and Written Opinion, PCT/CN2015/087568, dated Jan. 13, 2016, 12 pgs.
International Search Report and Written Opinion, PCT/CN2015/089564, dated May 27, 2016, 7 pgs.
International Search Report and Written Opinion, PCT/CN2015/090860, dated Jul. 21, 2016, 11 pgs.
Yang, Office Action, U.S. Appl. No. 15/057,877, dated May 8, 2017, 11 pgs.
Yang, Office Action, U.S. Appl. No. 15/059,104, dated Apr. 21, 2017, 10 pgs.
Yang, Notice of Allowance, U.S. Appl. No. 15/059,104, dated Sep. 26, 2017, 8 pgs.
Yang, Office Action, U.S. Appl. No. 15/056,930, dated May 18, 2018, 15 pgs.
Yang, Notice of Allowance, U.S. Appl. No. 15/057,877, dated May 17, 2018, 7 pgs.
Guo, Final Office Action, U.S. Appl. No. 15/059,119, dated Dec. 28, 2017, 12 pgs.
Guo, Notice of Allowance, U.S. Appl. No. 15/059,119, dated Mar. 19, 2018, 7 pgs.
Yang, Final Office Action, U.S. Appl. No. 15/057,877, dated Nov. 3, 2017, 13 pgs.
Yang, Office Action, U.S. Appl. No. 15/056,851, dated Sep. 25, 2017, 7 pgs.
Yang, Final Office Action, U.S. Appl. No. 15/056,851, dated Dec. 26, 2017, 9 pgs.
Yang, Notice of Allowance, U.S. Appl. No. 15/056,851, dated Apr. 6, 2018, 7 pgs.

* cited by examiner

HEAD-MOUNTED ELECTRONIC DEVICE

RELATED APPLICATION

This application is a continuation application of PCT Patent Application No. PCT/CN2015/087564, entitled "HEAD-MOUNTED DISPLAY DEVICE" filed on Aug. 19, 2015, which is incorporated by reference in its entirety.

TECHNICAL FIELD

The present disclosure relates to head-mounted electronic devices, and more particularly relates to a head-mounted electronic device having a headphone and a display portion capable of rotating relative to each other.

BACKGROUND

As a near-eye display device, the head-mounted electronic device generates images and projects the images to eyes of a user, which enables the user to watch amplified virtual images, thus a greater display effect can be obtained accordingly. Currently, as for most of head-mounted electronic devices, audio is transmitted to the user by an earphone coupled thereto. However, sound effect obtained by the earphone is usually common. Thus, to overcome this disadvantage, some product is integrated with a headphone having a better sound effect. The angle between the headphone and a display portion is a predetermined angle, for example, 90 degrees, which facilitates the user to easily wear the headphone and also allows the user to watch images projected by the display portion. Although this design provides a better sound and video effect, the overall volume is too big to carry around.

SUMMARY

Embodiments of the present application provide a head-mounted electronic device having a headphone and a display portion which are capable of rotating relative to each other, and it is convenient to carry around the head-mounted electronic device.

The head-mounted electronic device includes a headphone and a display portion. The headphone includes a C-shaped elastic belt and has two connection ends, and two sound generators connected to the connection ends respectively. The display portion includes a main body configured for generating and projecting images, and two connection members which are connected to opposite ends of the main body respectively and are rotatably connected to the sound generators respectively. A part of each connection member arranged between the corresponding sound generator and the main body defines a notch.

In the present application, when the display portion is rotated relative to the headphone, possible distortion of the display portion is limited to the connection member where the notch is defined, which may protect the main body and the sound generator from deformation, thus facilitating the display portion to rotate relative to the headphone.

BRIEF DESCRIPTION OF THE DRAWINGS

Various embodiments of the present application will be specifically illustrated in combination with the detailed embodiments and the following accompanying drawings. It should be understood that each component in the accompanying drawings is not representative of the actual size and scale, which is a schematic just for illustration, and is not to be construed as a limitation of the present application.

DETAILED DESCRIPTION

To better understand purposes, technical solutions, and advantages of the present application, the following will further illustrate the present application in combination with various embodiments and the accompanying drawings. It should be understood that the specific embodiments described herein are merely used to illustrate the present application, and are not a limitation of the present application. Moreover, the display does not represent the actual scale of each element of the present application, and are just schematic. It must be pointed out that the "connection" between two elements mentioned in the present application does not necessarily refer to direct connection between two elements, and can be indirect connection between the two elements which is realized by a third element.

Figure 1:
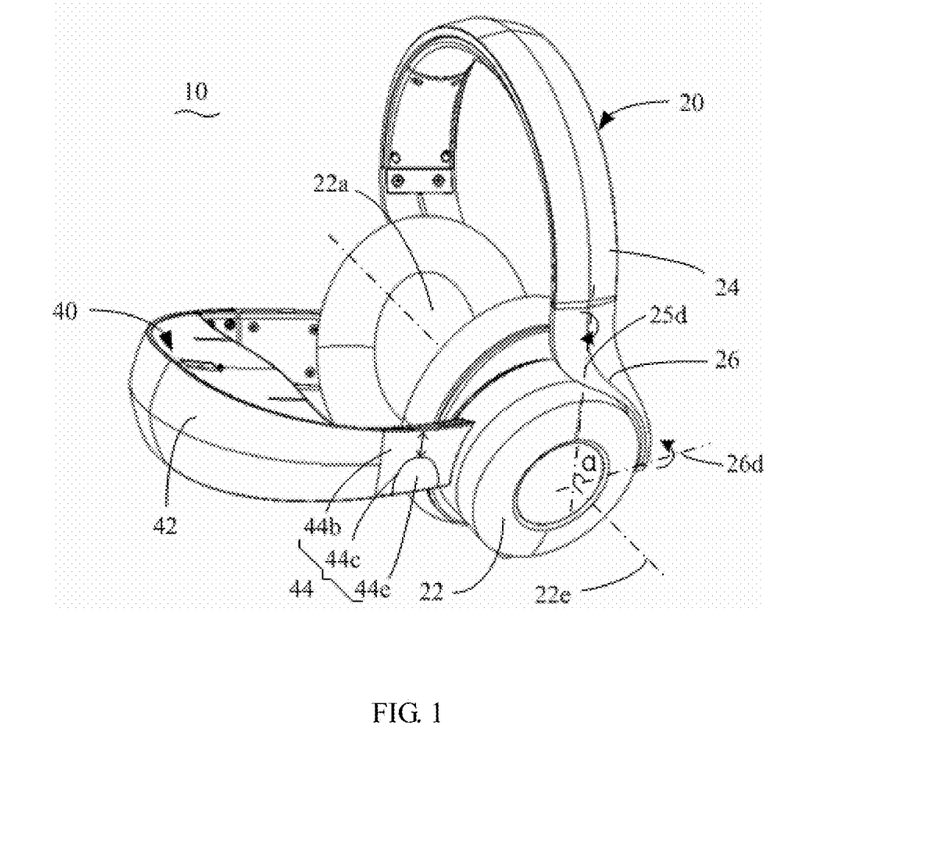
FIG. 1 is a perspective view of a head-mounted electronic device in accordance with an exemplary embodiment of the present application, wherein the headphone and the display portion are in an unfolded state.
Figure 5:
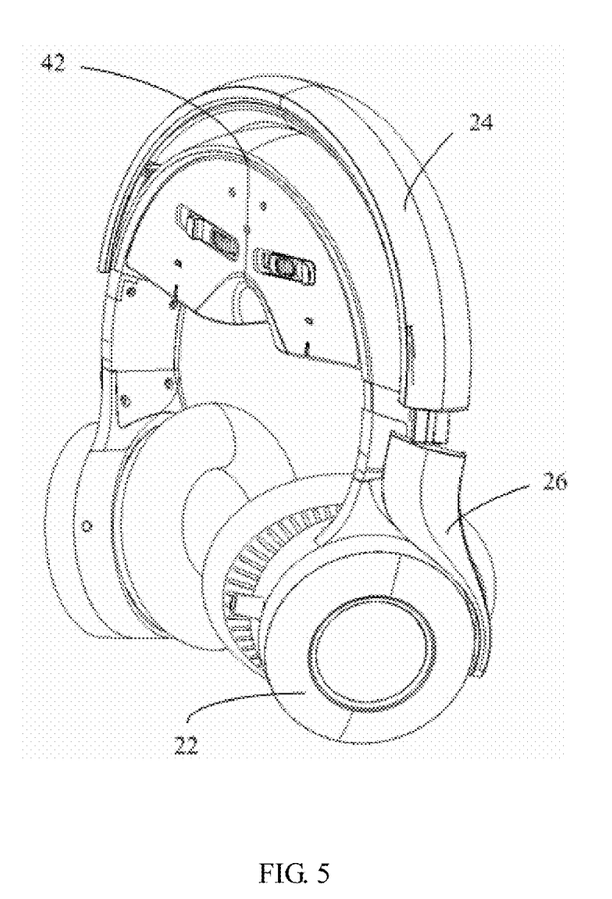
FIG. 5 is a perspective view showing the headphone and the display portion of the head-mounted electronic device being in a folded state.

FIG. 1 is a perspective view of a head-mounted electronic device 10 in a first embodiment of the present application. The head-mounted electronic device 10 may be a head-mounted video player, a head-mounted game device, a head-mounted navigator, or the like. The head-mounted electronic device 10 includes a headphone 20 and a display portion 40. The display portion 40 can be rotatably connected to the headphone 20. By doing so, referring to FIG. 1, in a used state, the display portion 40 can be rotated to angle with the headphone 20 in 90 degrees. At this point, after a user wears the headphone 20, the display portion 40 is located at the front of user's eyes and projects images to the user's eyes. Referring to FIG. 5, when in an idle state, the display portion 40 can be rotated to overlap with the headphone 20 to facilitate storing the headphone 20.

Figure 2:
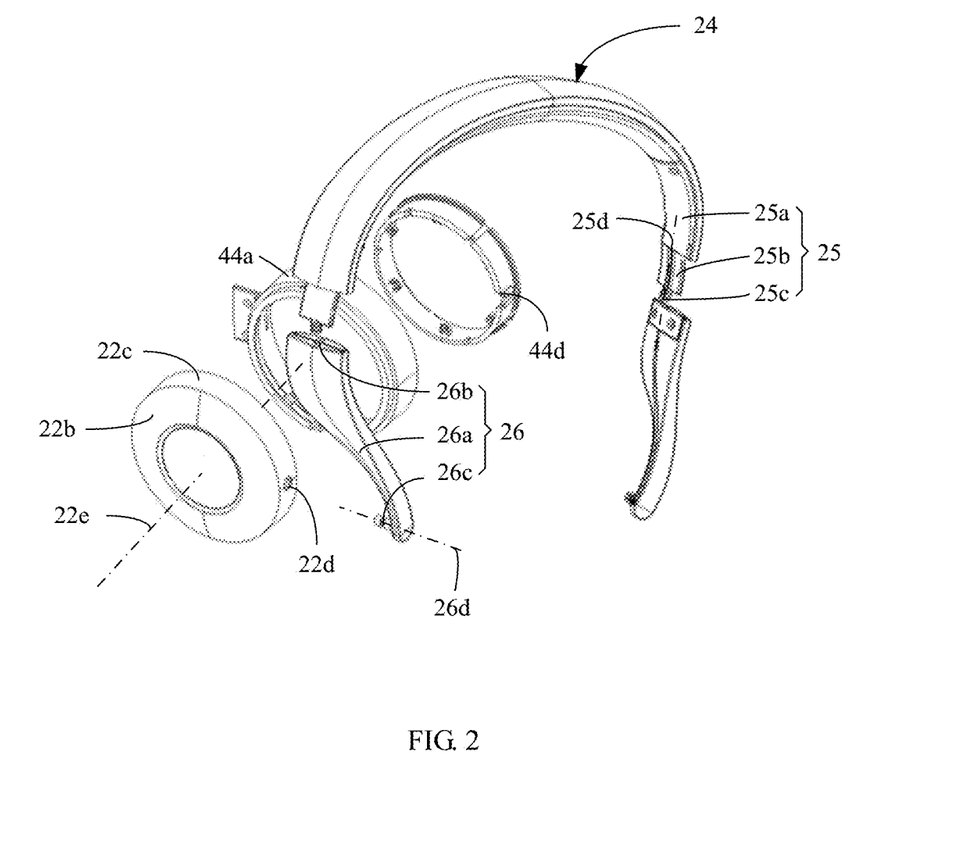
FIG. 2 is a partial disassembled view of the head-mounted electronic device shown in FIG. 1.

Referring to FIGS. 1-2, the headphone 20 includes two sound generators 22, an elastic belt 24, and two movable members 26 for movably connecting the two sound generators 22 to the elastic belt 24. The elastic belt 24 is substantially C-shaped, and has two connection ends 25 at the C-shaped open. The elasticity of the elastic belt 24 allows the two connection ends 25 to move close to each other or away from each other. In the embodiment, each connection end 25 includes a sleeve portion 25a and a first sliding member 25b slideably received in the sleeve portion 25a. A first protruding post 25c protrudes from a side of the first sliding member 25b away from the sleeve portion 25a. A portion of the first sliding member 25b is capable of sliding out of the sleeve portion 25a. The first protruding post 25c defines a first axis 25d. The configuration of the first sliding member 25b allows the user to adjust the distance between the elastic belt 24 and the sound generators 22. It should be understood that, the first sliding member 25b is optional when the elastic belt 24 can be elongated or there is no need to adjust the distance between the elastic belt 24 and the sound generators 22.

Each movable member 26 is rotatably connected to the corresponding connection end 25 about the first axis 25d, which enables the movable member 26 to rotatable around the first axis 25d relative to the connection end 25. In the embodiment, the movable member 26 is substantially arc-shaped, and includes an arc-shaped base body 26a, a first through hole 26b recessing from an end of the base body 26a adjacent to the connection end 25, and a second protruding post 26c extending from the other end of the base body 26a in a direction toward the sound generator 22. The first protruding post 25c is inserted into and latched onto the first through hole 26b, which enables the first protruding post 25c to be able to rotate in the first through hole 26b.

Each sound generator 22 is rotatably connected to the corresponding movable member 26 about a second axis 26d, which enables the sound generator 22 to be able to rotate around the second axis 26d on the movable member 26. In the embodiment, each sound generator 22 includes an inner wall 22a from which the voice emanating, an outer wall 22b opposite to the inner wall 22a, and a sidewall 22c extending from a rim of the outer wall 22b to the inner wall 22a. The sidewall 22c in the embodiment is a cylindrical wall. The outer wall 22b cooperates with the sidewall 22c to form a chamber (not shown). The loudspeaker (not shown) of the sound generator 22 is received in the chamber with a side from which the voice generate facing the inner wall 22a. The sidewall 22c defines a second through hole 22d. The second protruding post 26c is inserted into the second through hole 22d, and is further latched onto the chamber, which enables the sound speaker 22 to rotate around the second protruding post 26c, namely, the second protruding post 26c defines the second axis 26d. The second axis 26d angles with the first axis 25d in an angle α. Therefore, the sound generator 22 and the movable member 26 are rotatable around the first axis 25d, and the sound generator 22 is also rotatable around the second axis 26d, thereby enabling the sound generator 22 rotating in multiple dimensions. It is noted that, configurations of the mentioned protruding posts 25c, 26c and through hole 26b, 22d can be reversed, for example, the movable member includes the first protruding post 25c, while the first through hole 26b is defined on the connection end 25.

The display portion 40 includes a main body 42 and two connection members 44. The main body 42 is used for generating and projecting images. In detail, the main body 42 includes image generating devices and optical modules (not shown). Images generated by the image generating device pass through the optical module and is projected toward a scheduled direction. An adjustment structure (not shown) is arranged on the main body 42. The adjustment structure is used for adjusting a distance between the image generating device and the optical module, so as to fit in with different eyesight of users. The adjustment structure is also used to adjust the distance between groups of the image generating device and the optical module, to fit in with different pupillometer.

The two connection members 44 are connected to opposite ends of the main body 42, each connection member 44 is rotatably connected to a corresponding sound generator 22 around a third axis 22e. The third axis 22e extends from the outer wall 22b toward the inner wall 22a. Therefore, the display portion 40 is capable of rotating to a position separating from the headphone 20, shown in FIG. 1, and a position where the display portion 40 overlaps with the headphone 20, shown in FIG. 5. In the embodiment, each connection member 44 includes a rotating member 44a and a connection sheet 44b. The connection sheet 44b defines a notch 44c. For example, the notch 44c is defined in the middle of the connection sheet 44b. The configuration of the connection sheet 44c lessens the width of the portion of the connection sheet 44b where the notch 44c is located, thereby enabling the connection sheet 44b to be easily deformed during the sound generators 22 being unfolded when the user wears or takes off the head-mounted electronic device, to further lessen possibility of the main body 42 being deformed, and thus to protect the main body 42. The rotating member 44a is connected to an end of the connection sheet 44b adjacent to the sound generator 22. The rotating member 44a in the embodiment is substantially annular, and includes a cylindrical wall. The rotating member 44a engages the side wall 22c of the sound generator 22 by a latching member 44d, thereby enabling the rotating member 44a being rotatable around a center axis of the sidewall 22c. Therefore, the sidewall 22c of the sound generator 22 defines the mentioned third axis 22e. The third axis 22e is substantially perpendicular to the first axis 25d and/or the second axis 26d.

Preferably, each connection member 44 further includes a rubber 44e. The notch 44c is filled with rubber 44e. The configuration of the rubber 44e is beneficial for the deformation of the connection sheet 44b, and also protects the connection sheet 44b from breaking apart at the same time.

When the head-mounted electronic device 10 is assembled and is in a use state, referring to FIG. 1, the display portion 40 can be rotated to a position angling with the headphone 20 in 90 degrees, without external force. It should be noted that the recited 90 degrees is merely for illustration, various habits of users may result in different angles, for example, 70 degrees, 80 degrees, or 100 degrees. At this time, referring to FIG. 3, ends of the sound generators 22 away from the elastic belt 24 slants toward each other, thus, a second angle β is formed between different third axis 22e of the sound generator 22. The configuration of the second angle β makes for the sound generator 22 to be further fit users' ears.

Figure 3:
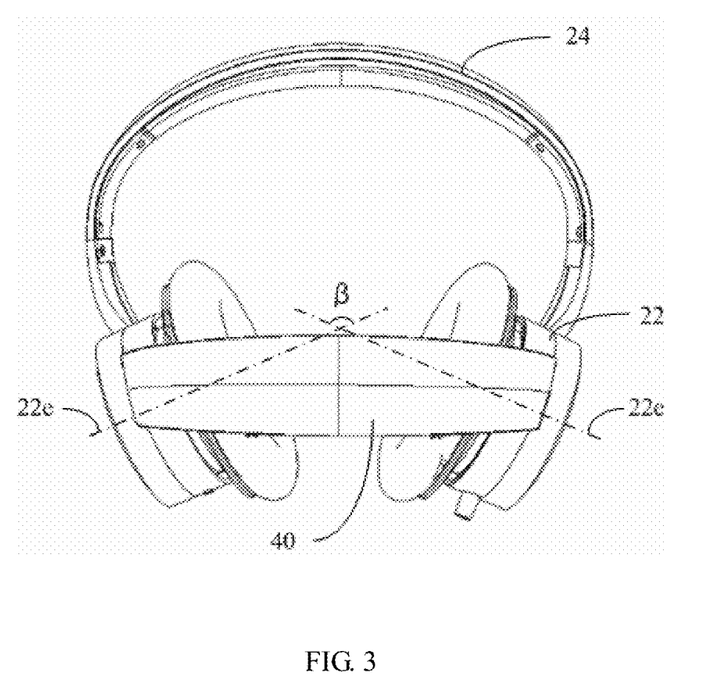
FIG. 3 is a front view of the head-mounted electronic device of FIG. 1.

Referring to FIG. 1 and FIG. 3, when the display portion 40 is rotated to overlap with the headphone 20, the display portion 40 is rotated in an upward direction shown in FIG. 3. Because the third axis 22e is slant relative to the horizontal direction shown in FIG. 3, and the main body 42 cannot be elongated, thus, when the display portion 40 is rotated upwardly, the right sound generator 22 in FIGS. 1 and 3 is driven to rotate around the second axis 26d anticlockwise (see the arrow signed on the second axis 26d in FIG. 1), namely, a side of the right sound generator 22 adjacent to the first through hole 26b rotates in a direction adjacent to the other sound generator 22, and the other sound generator 22 rotates in a reverse direction. At the same time, the upward rotation of the display portion 40 also drives the right sound generator 22 and the right movable member 26 in FIGS. 1 and 3 to rotate around the first axis 25d in an arrow direction marked thereon, namely, a side of the right sound generator 22 adjacent to the second protruding post 26c rotates in a direction away from to the other sound generator 22.

Based on the above description, in the embodiment, because of the configuration of the second angle β, the sound generator 22 is well fit users' ears, which results in better audio effect. However, at this point, the third axis 22e is not horizontally disposed, namely, the two third axises 22e are not aligned with each other but angle with each other, thus the process of the display portion 40 rotating relative to the headphone 20 becomes more complex. In this situation, if the elastic belt 24 is fixed to the sound generator 22 directly, that is, the movable member 26 is omitted, the elastic belt 24 and the connection member 44 will deform during the display portion 40 rotating relative to the sound generator 22. However, in the embodiment, after the movable member 26 is arranged to the headphone 20, the sound generator 22 is rotatable around the above two-dimensional to allow the sound generator 22 is driven by the display portion 40 to rotate around the first axis 25d and the second axis 26d, thereby protecting the elastic belt 24 and the connection member 44 from distortion, and further enabling the display portion 40 can rotate to overlap with the headphone 20.

In above embodiment, the base body 26a of the movable member 26 extends for a quarter of a circle, that is, the first angle α is substantially 90 degrees. However, it should be understood that the sound generator 22 can also rotates in two-dimensional to achieve the above purpose. Therefore, the first angle α is not limited to 90 degrees. Preferably, the first angle α is greater than 30 degrees but is less than 150 degrees, or is greater than 210 degrees but is less than 330 degrees. At this time, the length of the main body 26a is changed accordingly.

In the above embodiment, the second angle β is substantially 150 degrees when no external force is applied to the head-mounted electronic device 10. However, it should be understood that for different persons, the second angle β may change, on condition that the head-mounted electronic device 10 can be well fit in with user's ears. Preferably, the second angle β is greater than 100 degrees but is less than 170 degrees.

Figure 4:
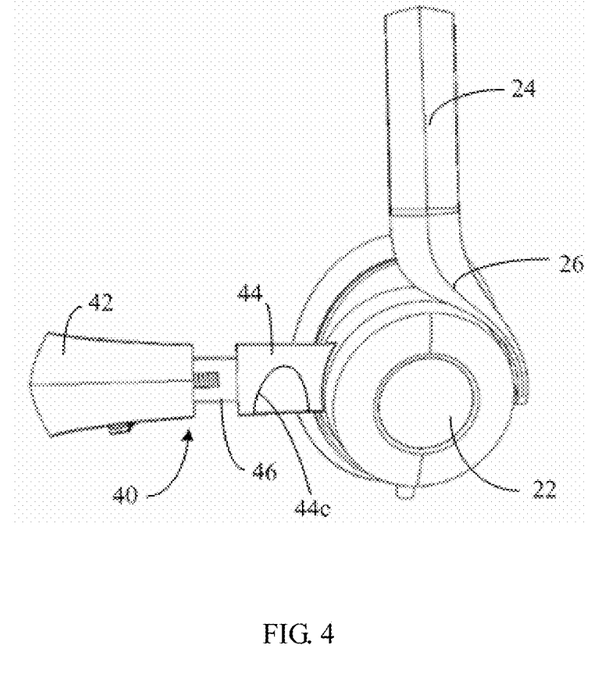
FIG. 4 is a side view of the head-mounted electronic device shown in FIG. 1.

Preferably, the movable member 44 is movably connected to the main body 42 or the sound generator 22, thus the movable member 44 is movable to a first position adjacent to the main body 42 or the sound generator 22 and a second position away from the main body 42 or the sound generator 22. As a result, the distance between the main body 42 and users' eyes can be adjusted. In detail, referring to FIG. 4, take the movable member 44 being movably connected to the main body 42 as an example, the display portion 40 further includes two support members 46 extending outwardly from opposite ends of the main body 42, and the connection member 44 slidably engages with the support members 46, thereby enabling the main body 42 to be closed to or away from the sound generator 22. Means of the connection member 44 being movably connected to the sound generator 22 is similar to that of the connection member 44 being movable connected to the main body 42, which will not be repeated herein.

Figure 6:
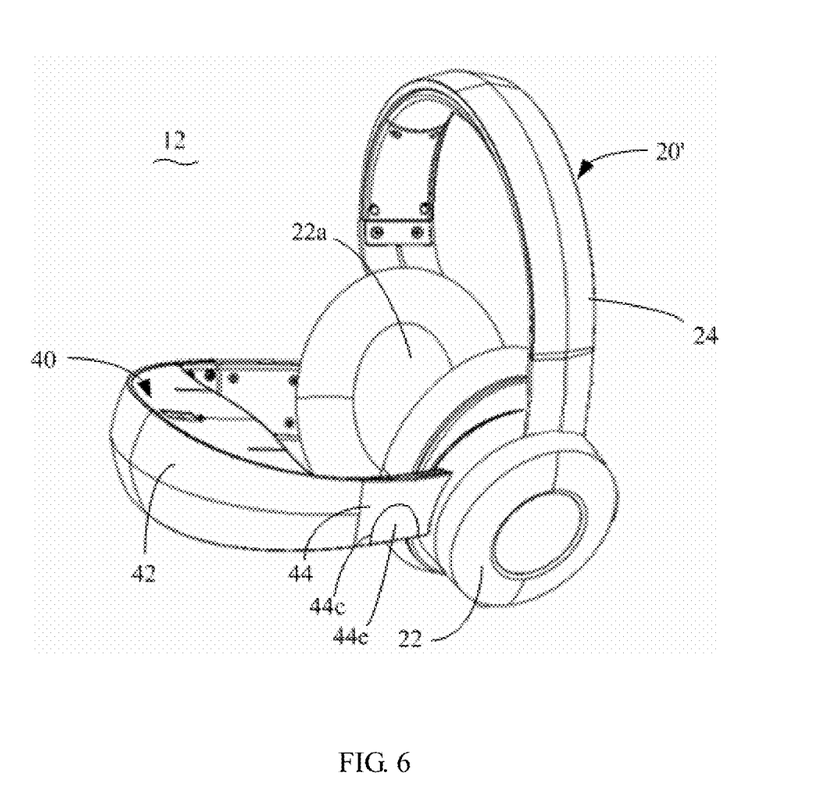
FIG. 6 is a perspective view of a head-mounted electronic device in accordance with another embodiment of the present application.

It is understood that, when the movable member 26 in the above embodiment is omitted and the connection member 44 retains the configuration of notch 44c, referring to FIG. 6, that is, the head-mounted electronic device 12 includes a headphone 20' and the display portion 40. The headphone 20' includes a substantially C-shaped elastic belt 24 with two connection ends, and two sound generators 22 connected to the connection ends respectively. The display portion 40 includes a main body 42 for generating and projecting out images and two connection members 44. The connection members 44 are coupled to opposite ends of the main body 42 and are rotatably connected to the sound generators 22 respectively. A portion of each connection member 44 between the corresponding sound generator 22 and the main body 42 defines a notch 44c. Because the connection member 44 deforms easily at the notch 44c, possible distortion of the display portion 40 is limited to the connection member 44 where the notch 44c is defined, which may protect the main body 42 and the sound generator 22 from deformation, thus facilitating the display portion 40 to easily rotate relative to the headphone 20.

In the description of the present application, the "first", "second" are merely used for description, and cannot be understood to indicate or imply relative importance or implicitly indicate the number of the indicated technical features. Therefore, features with a limitation of "first" or "second" can explicitly or implicitly include one or more feature. In the description of the present application, "multiple" means two or more than two, unless there is specific limitation.

In the description of the present application, unless explicitly stated and limited, "mounted", "connected", and "connection" should be construed broadly. For example, connection may be a fixed connection, can also be a detachable connection, can be an integral connection, can be a direct connection, can be an in direct connection realized by an intermediate medium, or can be an internal connection or an interaction between two elements. Those skilled in the art can understand the specific meanings of the above terms in the present application according to specific conditions.

The foregoing description is only the preferred embodiments of the present application, but is not intended to limit the scope of the invention. Accordingly, any modification, alternatives, improvements or the like within the spirit and principles of the present application should be included in the scope of the present application.

What is claimed is:

1. A head-mounted electronic device, comprising:
  a headphone comprising an elastic belt and two sound generators, wherein the elastic belt is C-shaped and has two connection ends, wherein each of the two sound generators includes a periphery and a body, and each sound generator is connected to one of the two connection ends at the periphery of the sound generator; and
  a display portion comprising a main body and two connection members connected to opposite ends of the main body and rotatably connected to the sound generators, respectively, wherein the main body is used for generating and projecting images to both eyes of a user of the head-mounted electronic device, and a portion of each connection member between a corresponding sound generator and the main body has a notch, and wherein the display portion is configured to rotate with respect to the sound generators to reach a folded position in which the headphone overlaps and hugs around the display portion.

2. The head-mounted electronic device as described in claim 1, wherein each connection member comprises a movable member rotatably connected to the corresponding sound generator and a connection sheet, the notch is defined in the connection sheet and filled with rubber material.

3. The head-mounted electronic device as described in claim 1, wherein the headphone further comprises two movable members, each movable member is rotatably connected to a corresponding connection end around a first axis, each sound generator is rotatably connected to the corresponding movable member around the axis, the axis including a second axis; the second axis and the first axis define a first angle; each connection member is rotatably connected to a corresponding sound generator around a third axis; and the two third axes define a second angle.

4. The head-mounted electronic device as described in claim 3, wherein each sound generator comprises an inner wall through which the sound propagates and an outer wall opposite to the inner wall, a corresponding third axis extending from the outer wall toward the inner wall.

5. The head-mounted electronic device as described in claim 4, wherein the movable member comprises a first end rotatably connected to a corresponding connection end around the first axis and a second end rotatably connected to a corresponding movable member around the second axis, and an arc-shaped curve portion is formed between the first end and the second end.

6. The head-mounted electronic device as described in claim 5, wherein for each sound generator further, the periphery further comprises a side wall extending from an edge of the outer wall toward the inner wall, and the movable member is rotatably connected to the side wall around the corresponding movable member.

7. The head-mounted electronic device as described in claim 5, wherein each connection end comprises one of a group of a first protruding post and a first through hole, the first end of each movable member comprises the other one of the group of a first protruding post and a first through hole, the first protruding post is rotatably latched onto the first through hole, and the first protruding post defines the first axis.

8. The head-mounted electronic device as described in claim 5, wherein each connection end comprises one of a group of a second protruding post and a second recess portion, the second end of each movable member comprises the other one of the group of a second protruding post and a second recess portion, the first protruding post is rotatably latched onto the first through hole, and the second protruding post defines the second axis.

9. The head-mounted electronic device as described in claim 6, wherein the side wall of each sound generator is a cylindrical wall and defines the third axis, and the connection member is rotatably connected to the sidewall around the third axis.

10. The head-mounted electronic device as described in claim 9, wherein an end of each connection member adjacent to a corresponding sound generator comprises a second cylindrical surface, the second cylindrical surface rotatably engages the side wall of the sound generator around the third axis.

11. The head-mounted electronic device as described in claim 3, wherein the third axis of each sound generator is substantially perpendicular to the first axis and the second axis.

12. The head-mounted electronic device as described in claim 3, wherein the second angle is between 100 degrees and 170 degrees.

13. The head-mounted electronic device as described in claim 6, wherein the first angle is between 30 degrees and 150 degrees.

14. The head-mounted electronic device as described in claim 3, wherein each movable member is translatably connected to the main body or the sound generator, and the movable member is movable to a first position adjacent to the main body or the sound generator and to a second position away from the main body or the sound generator.

15. The head-mounted electronic device as described in claim 3, wherein each movable member is translatably connected to the connection end, and the movable member is capable of moving to a first position adjacent to the elastic belt and a second position away from the elastic belt.

* * * * *